United States Patent Office 3,184,002
Patented May 18, 1965

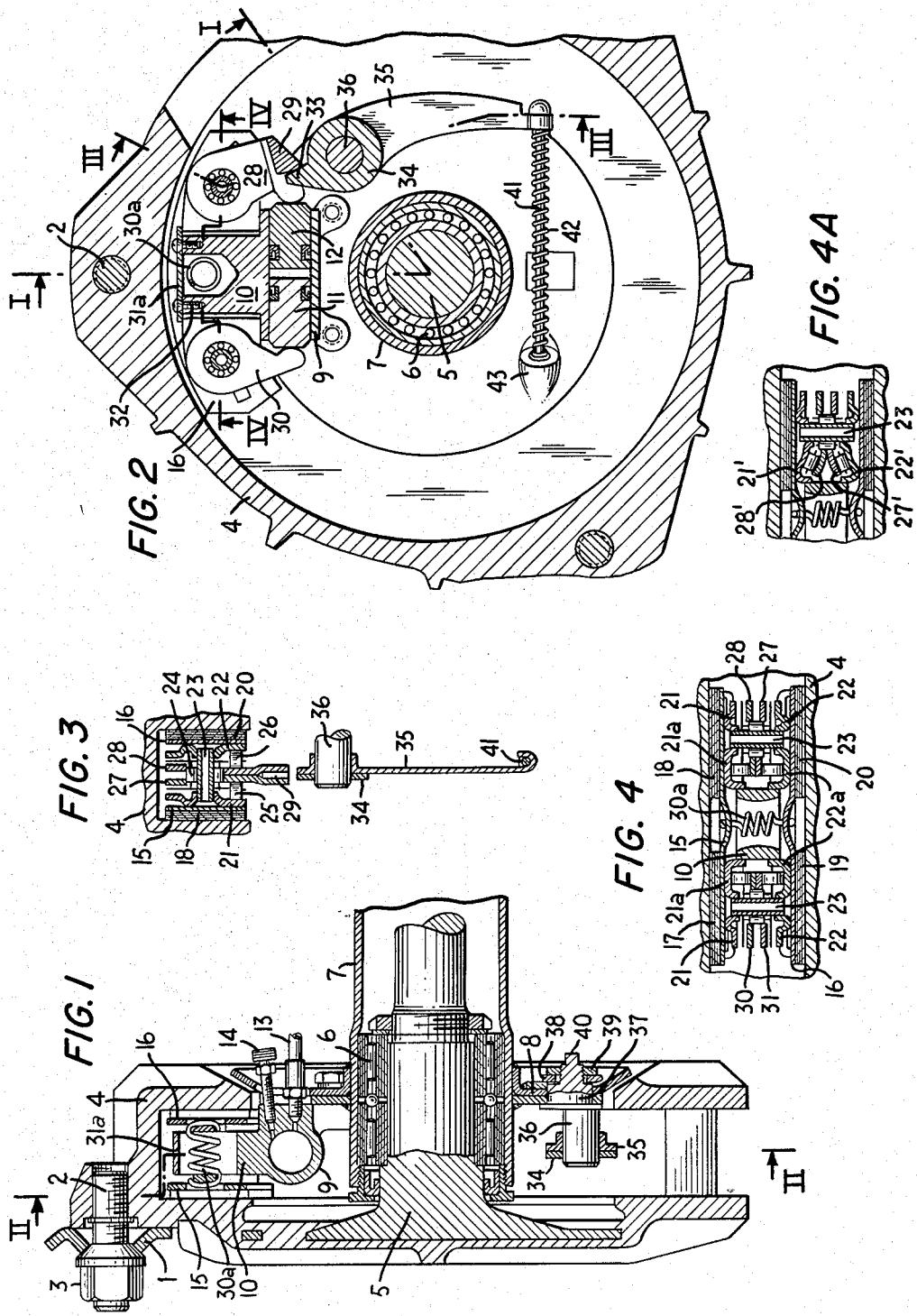

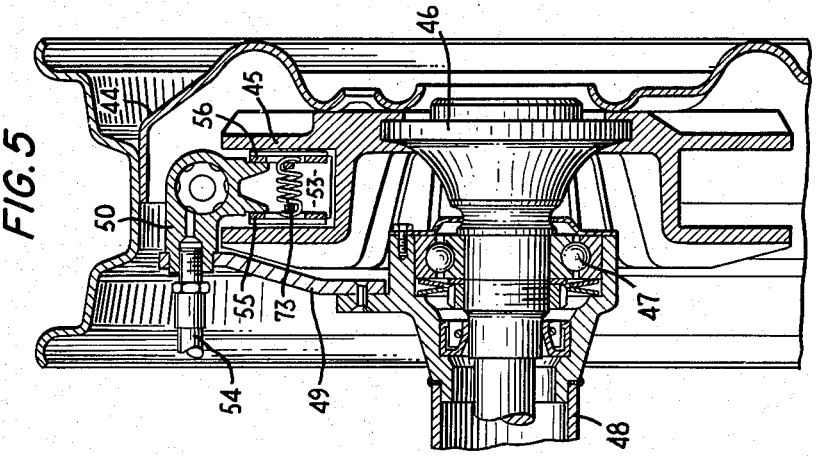
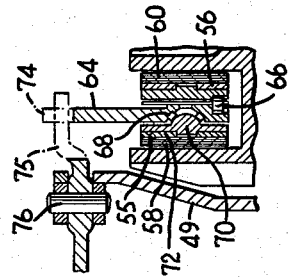
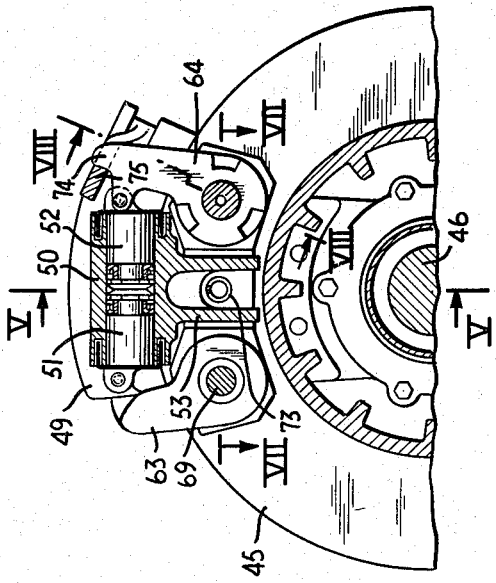
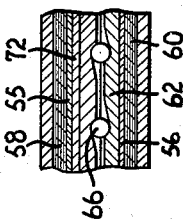
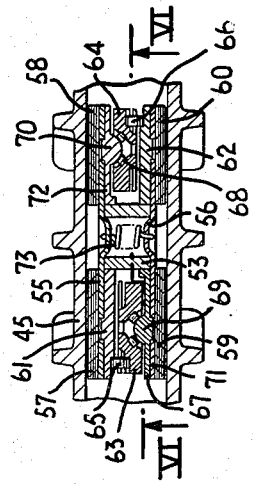

3,184,002
AXIALLY SPREADING BRAKE OF THE SECTIONAL BRAKE SHOE AND ROTARY CASING TYPE
Hermann Klaue, Konstanz (Bodensee), Germany
Filed Feb. 28, 1963, Ser. No. 261,663
Claims priority, application Germany, Feb. 28, 1962, K 46,019; Mar. 15, 1962, K 46,181
2 Claims. (Cl. 188—72)

My invention has for its object a brake of the sectional brake shoe and rotary casing type, more particularly intended for use on engine-driven vehicles.

Brakes of this sectional brake shoe type for engine-driven vehicles have already been proposed, wherein one or more pairs of segmental shoes are arranged inside a rotary brake casing provided preferably with radial ribs. Said segmental shoes carrying the frictional linings are urged against the inner frictional surface of the brake casing through the agency of control members of which the direction of movement extends radially or annularly in a plane perpendicualr to the axis of the brake and through the further agency of spacing means arranged between the segmental shoes and shifting the direction of the actuating force provided by said control members through 90°.

My invention provides an improvement for such brakes and it is directed more particularly to the arrangement and structure of the spaciing means arranged between the segmental shoe and also to the transfer of the reaction of the braking torque onto the parts rigidly secured to the vehicle.

A primary object of my invention consists in that the parts forming the means actuating the brake are arranged in a manner such that the actuating forces exerted in a plane perpendicular to the brake axis, do not increase the reaction forces transmitted in the same plane,, whereby reduction in the efficiency of the actuating means is reduced.

A further object of my invention consists in an arrangement of the structural members of the brake and, in particular, of the torque-absorbing members, which is such that an easy mounting and dismantling of the stationary brake unit with reference to the rotary brake casing are made possible through a recess formed outwardly thereof in the brake casing, or else,, through a circular open cut formed through the unit.

A still further object of my invention consists in a structure of the spacing means which is such that the unavoidable deformation of the rotary brake casing during operation, which deformation causes the frictional surfaces to assume a slightly conical shape, has no influence on the efficiency of the operation of the brake.

Yet another object of my invention consists furthermore in the arrangement of an auxiliary control lever for the brake so that the brake may be actuated not only through a hydraulic system but also mechanically, in particularly when the brake is to serve as a parking brake.

According to my invention, my improved brake provided with segmental shoes, includes, with a view to obtaining the above-mentioned advantages, two spacing means for each pair of segmental shoes, which spacing means are adapted to be rocked, in opposite angular directions for braking purposes, while the hydraulic, pneumatic or mechanical brake actuating means are arranged between the two spacing means provided each with a control lever and act in opposite directions on the two levers of the spacing means so that the actuating means remain under balanced pressure conditions.

It is advantageous for each spacing means to be constituted by a circular member provided with a lever-shaped extension for its actuation, said circular member being provided on either side with raceways sloping outwardly in a peripheral direction for engagement through rollers or balls uniformly distributed on either side of the circular member along the periphery thereof, and presser rings also provided with outwardly sloping peripheral raceways for said cylindrical rollers or balls, said presser rings being operatively connected with the segmental brake shoes. The circular member which will be termed hereinafter the medial ring, and which forms part of each spacing means, is carried through its own rollers on a cylindrical rod which interconnects the two segmental brake shoes.

In order to prevent any detrimental action of the above-mentioned unavoidable deformation of the rotary brake casing, there is provided, according to my invention, an arrangement according to which the frictional linings may be arranged obliquely with reference to each other in a manner such that they may match automatically any conical deformation of the brake casing; thus, the friction linings are prevented from engaging the brake casing only locally after deformation of said brake casing which would lead to a reduction in the efficiency of the brake.

According to my invention, this oblique position of the two shoes carrying the friction linings is obtained through the fact that the medial ring provided with the control lever engages along one or both sides, spherical raceways with the interposition of rolling members, said raceways sloping in a peripheral direction so as to produce a lifting movement. Thus, an oblique position becomes possible for the two frictional linings with reference to each other without this being detrimental to the efficiency of operation. The engagement of the rolling actuating members is performed on two races which are mirror images of each other and are provided on the two presser rings rigidly secured to the brake shoes.

According to a modification of my invention, it is also possible for a rotary actuating ring, to be provided on either side with raceways sloping in a peripheral direction and on which rotary members such as balls, rollers or needles rest and these rest in their turn with a rolling motion on correspondingly shaped counterparts. In this case, the raceways for the rotary members are formed in a manner such that they lie on the outer surfaces of a sphere of which the center lies in the middle of the brake unit.

The application of such rotary members for transferring the braking stresses makes, on the one hand, the centering an easier matter and, furthermore, it provides for a transmission of the actuating force through a rolling movement and it ensures lastly that the actuating ring be set without any clamping in a predetermined angular position with reference to the cooperating surface, whereby the pressure forces are transferred uniformly to the surfaces of the casing, even when the latter is deformed.

The shoe brake according to my invention may also be executed in a manner such that the brake casing engages along a cylindrical surface the outer diameter of the outwardly facing braking surfaces or else, it engages the inwardly facing braking surfaces in which latter case it is particularly easy to fit the stationary brake unit in position.

My invention will be now disclosed with further detail, reference being made to the accompanying drawings illustrating a preferred embodiment of my improved brake and showing further details of said invention.

FIG. 1 is, by way of example, a view of the brake for the rear wheel of a passenger carrying power vehicle in transverse cross-section, through line I—I of FIG. 2, the brake casing in this case being outwardly closed and the actuating parts being located inside said casing.

FIG. 2 illustrates the brake according to FIG. 1 in a longitudinal cross-section through line II—II of FIG. 1.

FIG. 3 shows the brake-actuating system as a partial cross-section through line III—III of FIG. 2.

FIG. 4 is a cross-section, on a larger scale, through the brake unit along line IV—IV of FIG. 2.

FIG. 4a is a fragmentary sectional view of the device.

FIG. 5 is a cross-section of a further embodiment through line V—V of FIG. 6.

FIG. 6 illustrates said further embodiment of the invention forming a brake for the rear wheel of a power driven vehicle in which embodiment the brake casing is closed inwardly and the actuating parts are arranged outside said brake. FIG. 6 is a longitudinal cross-section of the brake according to FIG. 5 in a plane indicated by the line VI—VI of FIG. 7.

FIG. 7 is a cross-section through line VII—VII of FIG. 6, showing a detail of the brake.

FIG. 8 is a cross-section through an actuating element of the brake through line VIII—VIII of FIG. 6.

FIG. 9 is a cylindrical development of a partial cross-section through the actuating rollers illustrated in FIGS. 7 and 8.

In the embodiment illustrated in FIGS. 1 to 4, actuating elements are used which produce a pressure in opposite directions on two parallel actuating surfaces. In contradistinction, the embodiment illustrated in FIGS. 5 to 9 shows actuating elements which allow a tilting movement and consequently an oblique positioning of the frictional linings.

In FIGS. 1 to 4, 1 designates the wheel of the vehicle to which the brake casing 4 is secured through the wheel bolts 2 and nuts 3. The brake casing 4 is constituted, in the example illustrated, so as to form also a hub rigid with the axle 5. The axle is carried by smooth bearings 6 inside the axle tube 7. On the axle tube 7 is welded the brake carrier 8 to which the brake cylinder 9 carrying its two pistons 11 and 12 is secured through screws. The brake cylinder 9 provided with a radially projecting extension 10 carries the actual brake unit.

Said brake unit includes chiefly the two segmental brake shoes 15 and 16 carrying respectively the lateral friction linings 17–18 and 19–20 and said unit includes further the two spacing means which are constituted by the presser rings 21 and 22 which are operatively connected with the segmental brake shoes and by medial rings constituted each by two parallel metal sheets as shown at 27, 28 and at 30, 31 while between said medial rings and the corresponding presser rings are inserted the rollers 25 and 26 acting as spacing members transmitting the spacing efforts. The entire brake unit may be removed through an opening provided in the brake casing 4. The two presser rings 21 and 22 carry in central bores the spindles 23 of which the axes are parallel with the axis of the brake and lie at the level of the brake linings and round which the two medial rings are adapted to roll with the interposition of rollers 24. Each of said medial rings is provided with a lever-shaped projection which engages the outer transverse surface of the corresponding cylinder piston 11 or 12, so that, upon actuation of the two pistons which are urged in opposite directions by the pressure which builds up in the brake cylinder, the two medial rings 27–28 and 30–31 are caused to rock in opposite directions round the spindles 23 in a plane perpendicular to the axis of the brake.

The medial rings are provided on both sides with raceways distributed along the periphery of said rings and sloping in an outward direction to be engaged by said rollers 25 and 26 and, similarly, the inner surfaces of the presser rings 21 and 22 are also provided with raceways sloping outwardly to form the cooperating surfaces engaging said rollers 25 and 26, whereby, upon a rocking movement of the medial rings, the rollers clamped each between a presser ring and the cooperating medial ring surface roll over said peripheral sloping raceways so as to urge the two presser rings away from the medial ring.

The presser rings 21 and 22 are provided along their edges facing each other with incurved projections 21a and 22a which engage the projecting extension 10 of the brake cylinder 9, whereby the torque produced by the braking is transferred through said extension 10 to the brake carrier 8 and to the axle tube 7. A return spring 30a interconnects the two segmental brake shoes 15 and 16 and urges them towards each other so that the brake is ventilated when the brake cylinder is not actuated. A cover made of a metal sheet 31a holds the brake unit fast in position. The securing screws 32 can be released by means of a tool introduced through an opening provided in the brake casing 4. Thus, the cover 31a may be released and the whole brake unit removed through said opening.

The brake described with reference to FIGS. 1 to 4 operates as follows: when the brake cylinder is not actuated, the two segmental brake shoes provided with their brake linings are urged towards each other by the return spring 30a so that the brake linings are spaced with reference to the inner surfaces of the casing flanges. The pistons 11 and 12 in the brake cylinder enter their inoperative positions, that is they recede inside the cylinder.

The admission of compressed fluid into the brake cylinder is provided through the hose or pipe 13. 14 designates a safety screw for the brake cylinder. A compressed fluid such as braking oil being caused to enter the cylinder through the hose 13, the two pistons 11 and 12 move in opposite directions and away from each other so as to provide a rocking of the corresponding medial rings 27–28 and 30–31 in opposite directions. The force thus exerted in a plane perpendicular to the brake axis and providing a rocking movement of the medial rings, is transmitted through the spacing members constituted, in the embodiment considered, by the rollers 25 and 26 and is deflected as a consequence of the above-described obliquity of the raceways on the medial ring and on the presser rings into a direction at 90° registering with the direction of the brake axis, whereby the two segmental brake shoes and associated frictional linings are pressed against the inner surfaces of the brake casing through the presser rings 22 which are spaced apart by the spacing means against the action of the return spring 30a.

It is essential, in the case of the arrangement described, that, upon simultaneous rocking of both medial rings in opposite directions under the action of the pair of pistons in the cylinders, the pressures may be balanced inside the brake unit so that no supplementary resultant torque may be produced by the actuating forces in a plane perpendicular to the brake axis in which the braking torque is actually operative. The braking torque produced by the segmental brake shoes is absorbed by the two abutments provided in parallelism at the level of the brake and constituted by the projecting extension 10 formed on the brake cylinder 9 and separating the two spacing means.

In the brake illustrated in FIGS. 1 and 2, by way of example, there is also provided, in addition to the main control device constituted by the braking cylinder, a further purely mechanical control system acting advantageously as a parking brake. Since the operation of a parking brake requires a lesser stressing than that of the main brake operating on a running vehicle, it is sufficient to provide this auxiliary mechanical brake-actuating control system only on one half of the brake, that is on only one of the spacing means.

To this end, the two metal sheets 27 and 28 forming one of the medial rings are recessed at a point facing away from their lever-shaped extension so as to be welded to a pressing member 29 fitted between the sheets (FIG. 2). In the fork-shaped extension thus formed by the two metal sheets 27 and 28 is fitted a control cam 33 formed on an actuating roller 34 welded to a lever 35 forming the mechanical control member. The actuating roller 34 and the lever 35 are fitted on a pivot 36. This pivot 36 is eccentrically secured to a bolt 37 fitted on the brake carrier 8 through a centering washer 38 and a nut 39 (FIG. 1).

A four-sided extension 40 on the bolt 37 allows, after release of the nut 39, an adjustment of the eccentric cam. The mechanical actuation of the lever 35 is provided through the cable 41 (FIG. 3) surrounded by a compression spring 42 and which passes out of the brake carrier 8 through the port 43.

The above-described mechanical actuation operates thus through the lever 35, the actuating roller 34 and the cam 33 on the medial ring 27–28 in the same manner as in the case of the actuation of the main brake through the piston 12 of the cylinder 9.

The brake unit constituted by the two segmental brake shoes 15 and 16 with their frictional linings and spacing means can be removed for exchange out of the brake, while the brake cylinder 9, the actuating roller 34 and the lever 39 remain inside the brake casing. When inserting another brake unit, care should merely be taken to introduce the cam 33 into the fork formed by the metal sheets 27 and 28 of the corresponding medial ring. In the case of a hydraulic or pneumatic actuation of the brake, the two spacing means are operated so that all the frictional linings may be applied against the peripheral inner surface of the rotary brake casing. In the case of a mechanical actuation, in contradistinction, only the frictional linings 18 and 20 serve, in the case illustrated, for braking purposes. Obviously, it is possible to provide a further actuating lever for the control of the other spacing means, which further lever may be actuated for instance by a Bowden cable sheath so as to engage the entire braking surface when operating the brake mechanically. On the other hand, it is obviously also possible to substitute mechanical actuation for the main pneumatic or hydraulic actuation of the brake.

Whereas the brake casing is outwardly closed in the example illustrated and the brake cylinder lies inside the outer periphery of the brake casing, the second embodiment illustrated in FIGS. 5 to 9 relates to a brake wherein the brake casing 45, rigidly secured to the vehicle wheel 44, is closed inwardly, while the brake cylinder 50 is located outside the outer surface of the casing. The brake casing 45 is also rigidly secured in this embodiment to the axle 46 extending through the axle tube 48 and carried inside the latter by the roller bearing 47. The axle tube 48 is riveted to the brake carrier 49 to which the brake cylinder 50 enclosing its pistons 51 and 52 is secured through screwing. The brake cylinder is provided with a radial inwardly directed extension 53 carrying the actual brake unit. The compressed fluid required for actuating the brake cylinder is fed through the hose or pipe 54.

In this second embodiment, the brake unit includes, as preceding, the two segmental brake shoes 55 and 56 with the frictional linings 57–58 and 59–60 associated with the two spacing means arranged between said two segmental brake shoes 55 and 56. Each of the two spacing means includes a presser member 61 or 62 provided along its lateral surface with peripheral outwardly sloping raceways for the spacing members and a medial ring 63 or 64 serving as an actuating lever and provided also on its surface facing the presser member with a peripherally sloping raceway, while the cylindrical rollers 65 and 66 forming the spacing members are clamped between said oblique raceways on the presser members and medial rings. A rocking of the medial ring 63 or 64 round its axis which is, as precedingly, parallel with the brake axis, produces, by reason of the presence of the oblique raceways, the desired spacing operation.

In contradistinction with the first embodiment where the medial rings were provided symmetrically on both sides with raceways sloping in a peripheral direction, so that the braking stresses were transmitted symmetrically to the two brake linings facing each other, the reaction forces are absorbed, in the embodiment illustrated in FIGS. 5 to 8, by the rollers 67 or 68 lying in the space separating the medial ring 63 or 64 on the side opposed to said presser member 61 or 62 from a further presser member 71 or 72. These rollers 67 or 68 engage an annular raceway on the medial ring and roll over a spherical projection 69 or 70 on the presser member 71 or 72. This arrangement allows transmitting the reaction forces arising when braking, through the rollers 67 and 68 to the spherical projections 69 and 70, the presser members 71 and 72 and consequently the cooperating brake linings.

Said presser members 61–62 and 71–72 transmit the torque produced upon braking to said extension 53 on the brake cylinder 50, the abutments absorbing the braking torque lying as precedingly at the level of the friction linings and between the two spacing members.

The two segmental brake shoes 55 and 56 are urged towards each other by a retraction spring 73 which provides for a ventilation of the brake when the brake cylinder is not under operation. Actuation of the brake is obtained in a manner similar to that already described with reference to the first embodiment. When a compressed fluid is fed onto both pistons 51 and 52 in the cylinder 50 through the pipe 54, the two pistons are urged away from each other in opposite directions and make the medial rings 63 and 64 rock until clearances have been cut out as a result of the rollers 65 and 66 running over the raceways on the presser members 61 and 62. An essential feature of this embodiment consists in that, by reason of the spherical shape given to the projections 69 and 70, a certain obliquity of the cooperating presser members 61 and 71 or 62 and 72 facing each other is allowed and thereby also a certain obliquity of the segmental brake shoes carrying the frictional linings, so that the friction linings may match any possible conical deformation of the brake casing arising during operation. This prevents any non-uniform application of the friction linings only at separate points upon deformation of the brake casing.

Instead of providing a spherical bearing on one of the presser members, said spherical bearings may obviously be provided as well on one side of the medial ring.

Furthermore, it is also possible to provide the raceways sloping peripherally along a surface of the medial ring or of one of the pressure rings with a part spherical shape, so as to allow the abovementioned obliquity for the segmental brake shoes. This is possible for instance in the case illustrated in FIGS. 1 to 4. If the raceways described with reference to said figures are given a spherical shape on any of the surfaces of the medial rings or pressure members, the two presser members and consequently the segmental brake shoes may assume an oblique position.

It is also possible to replace the rollers provided as spacing or bearing members by balls or needles.

The raceways or the spherically shaped bearing surfaces on the medial rings or on the presser members may be constituted advantageously in a manner such that they lie on spherical surfaces of which the center lies in the middle of the brake unit. Thus, it is possible to obtain easily and simply the obliquity of the brake linings without any wedging, in combination with the location of the rotary axis of the medial rings at the level of the brake linings, whereby the surfaces of the brake linings and the cooperating braking surfaces on the possibly deformed casing are always held fast together in parallelism with each other.

To provide an auxiliary mechanical actuation of the second embodiment according to FIGS. 5 to 9, the lever on the medial ring 64 is provided with a further extension 74 adapted to be subjected to the pressure of the lever 75 which is connected, on the other hand, for instance with the hand-operated braking lever of the ve-

What I claim is:
1. A brake for a rotary member in the suspended section of a vehicle, comprising a brake casing revolving in unison with the rotary member and including two spaced flanges perpendicular to its rotary axis, a brake carrier rigid with the suspended section of the vehicle, two pairs of parallel braking shoes disposed between said flanges and extending in face to face relationship with the casing flanges, said pairs being angularly spaced with reference to the rotary axis of the casing to either side of an axis of symmetry, means urging the corresponding shoes of both pairs towards each other into an inoperative position, a fluid-operated cylinder the axis of which extends across said axis of symmetry, two pistons carried inside said cylinder and adapted to be urged by the fluid away from each other in opposite directions, two medial rings revolvable each round a further axis parallel with the rotary axis of the casing and passing through the shoes of the corresponding pair, each medial ring being provided on its surface facing one braking shoe with a raceway sloping peripherally towards said braking shoe and with an annular raceway on its opposite surface, an outer projection on each medial ring adapted to be angularly shifted by the corresponding piston, a presser ring fitted between said annular raceway of each medial ring and the corresponding brake shoe and rigid with the latter and including a part-spherical projection, a series of rolling members inserted between the sloping raceway of each medial ring and the cooperating braking shoe, the angular shifting of each medial ring urging said rollers members towards the corresponding braking shoe to urge it away from the other braking shoe of the pair and towards the corresponding casing flange, a further series of rolling members inserted between said annular raceway of each medial ring and the part-spherical projection and adapted to transmit the reaction produced by the braking and to allow a slight tilting of the brake shoe rigid with said presser ring.

2. A brake for a rotary member in the suspended section of a vehicle, comprising a brake casing revolving in unison with the rotary member and including two spaced flanges perpendicular to its rotary axis, a brake carrier rigid with the suspended section of the vehicle, two pairs of parallel braking shoes disposed between said flanges and extending in face to face relationship between the casing flanges, said pairs being angularly spaced with reference to the rotary axis of the casing to either side of an axis of symmetry, means urging the corresponding shoes of both pairs towards each other into an inoperative position, a fluid-operated cylinder the axis of which extends across said axis of symmetry, two pistons carried inside said cylinder and adapted to be urged by the fluid away from each other in opposite directions, two medial rings revolvable each round a further axis parallel with the rotary axis of the casing and passing through the shoes of the corresponding pair, each medial ring being provided on one surface facing the braking shoe with a raceway sloping peripherally towards the corresponding braking shoe and with an annular raceway on its opposite surface, an outer projection on each medial ring adapted to be angularly shifted by the corresponding piston, a presser ring fitted between said annular raceway of each medial ring and the corresponding brake shoe and rigid with the latter, and including a part-spherical projection, a series of rolling members inserted between the sloping raceway of each medial ring and the cooperating braking shoe, the angular shifting of each medial ring urging said roller members towards the corresponding braking shoe to urge it away from the other braking shoe of the pair and towards the corresponding casing flange, a further series of rolling members inserted between said annular raceway of each medial ring and the part-spherical projection and adapted to transmit the reaction produced by the braking and to allow a slight tilting of the brake shoe rigid with said presser ring, a hand-operated lever pivotally secured to the brake carrier, a cam controlled by said lever and adapted to engage one of the medial rings to rock the latter and operate the brake.

References Cited by the Examiner
UNITED STATES PATENTS

| 2,278,144 | 3/42 | Milan | 188—72 |
| 2,629,474 | 2/53 | Weiland | 192—70 X |
| 2,633,941 | 4/53 | Zindler | 188—106 |
| 2,867,297 | 1/59 | White | 188—152 |
| 2,883,007 | 4/59 | Klaue | 188—72 |
| 2,957,550 | 10/60 | Burnett | 188—70 |
| 2,976,956 | 3/61 | Behles | 188—72 |

FOREIGN PATENTS 214,301  3/61  Austria.

ARTHUR L. LA POINT, *Primary Examiner.*
EUGENE G. BOTZ, *Examiner.*